Oct. 26, 1971   F. J. EARLY, JR   3,615,019
UNDERDRAIN SYSTEM FOR WATER FILTRATION PLANT
Filed Aug. 13, 1970   5 Sheets-Sheet 1

INVENTOR.
FRED J. EARLY, JR.
BY Joseph F. Cole
ATTORNEY

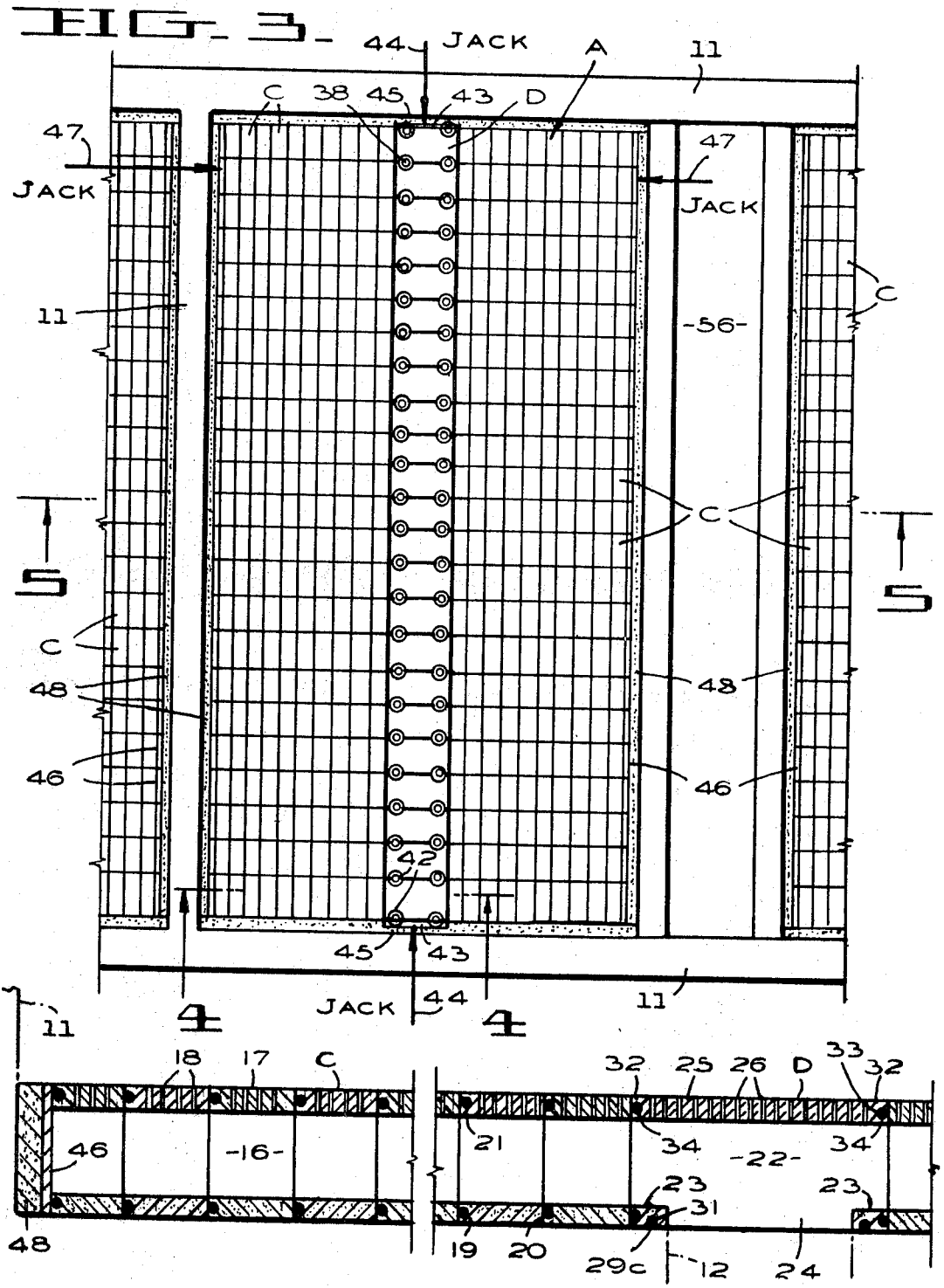

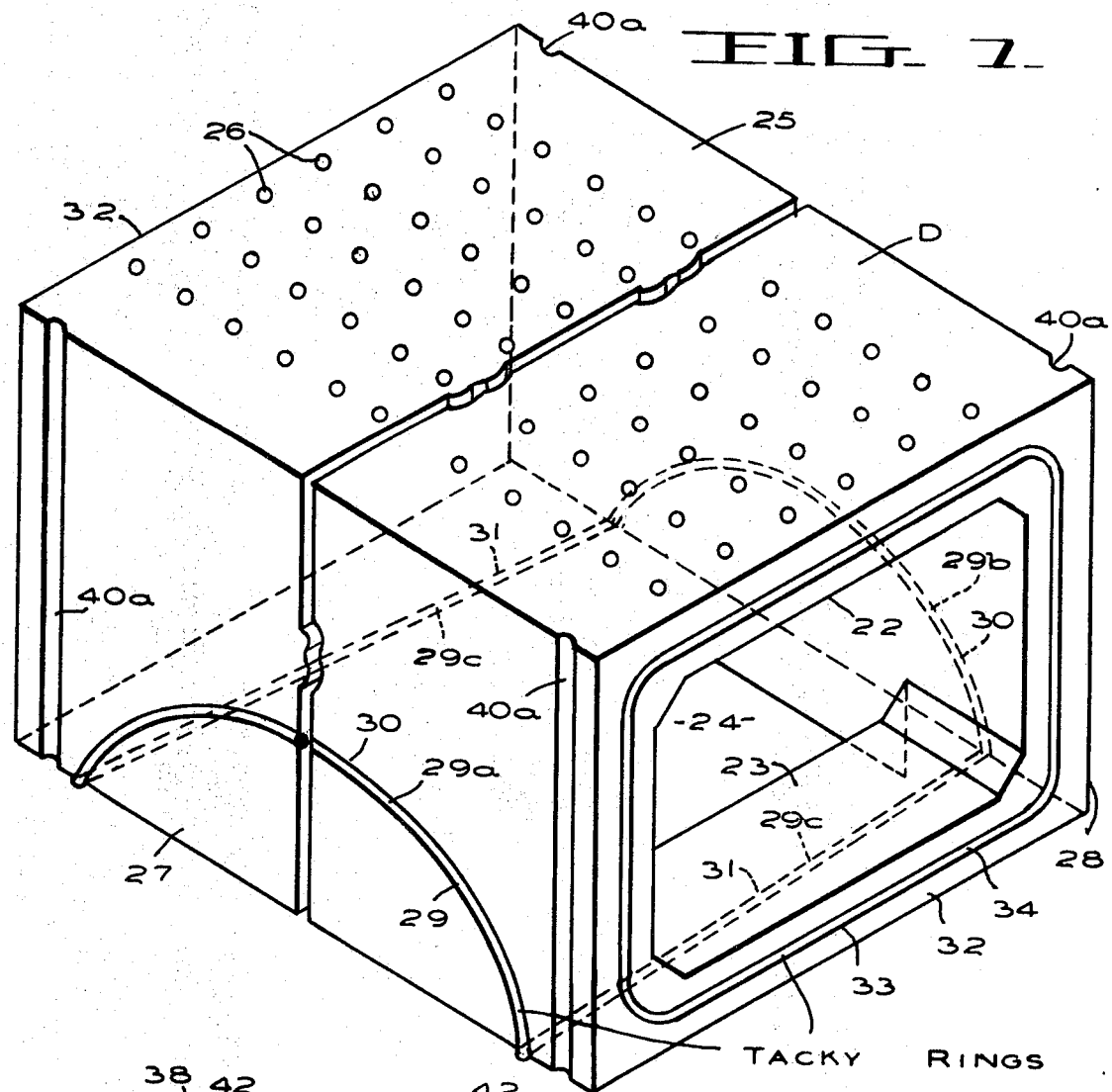
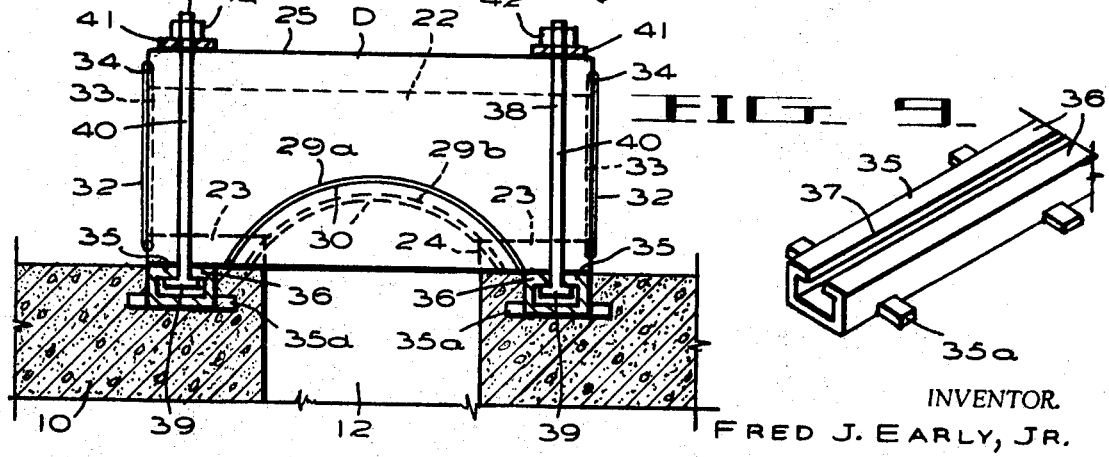

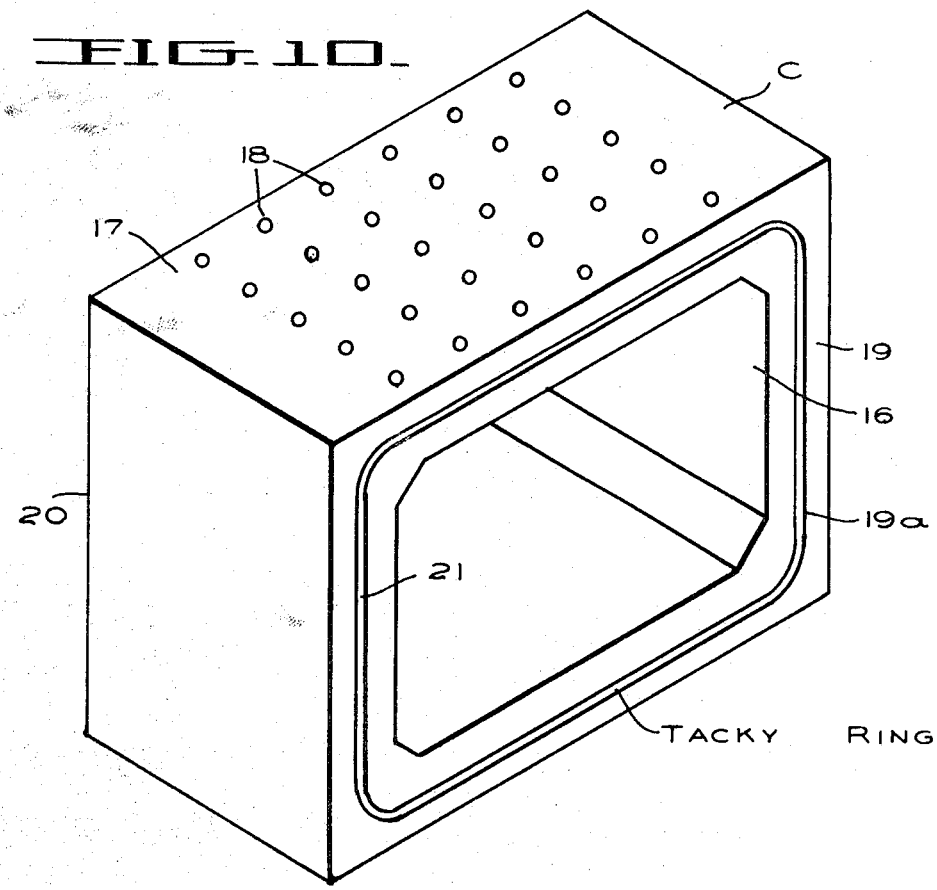
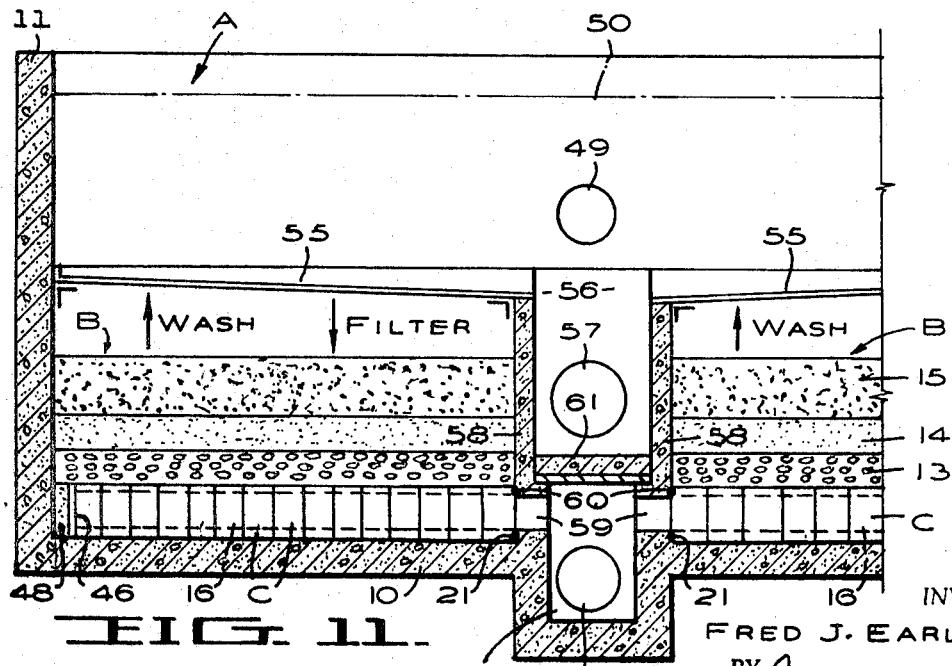

United States Patent Office 3,615,019
Patented Oct. 26, 1971

3,615,019
UNDERDRAIN SYSTEM FOR WATER
FILTRATION PLANT
Fred J. Early, Jr., 369 Pine St.,
San Francisco, Calif. 94104
Filed Aug. 13, 1970, Ser. No. 63,481
Int. Cl. B01d 23/18
U.S. Cl. 210—293
12 Claims

ABSTRACT OF THE DISCLOSURE

An underdrain system for water filtration plant, wherein a filter basin has a floor and upwardly-extending walls rising therefrom to define a crib for holding filter media, the basin having a gullet in its floor. Rows of underdrain blocks are provided on the floor and adjacent underdrain blocks are end-abutted with compressed sealing rings being interposed therebetween to form water-tight joints. Moreover, a row of gullet blocks are centered over the gullet, and these blocks are side-abutted, with compressed rings being arranged between the sides of adjacent gullet blocks to form water-tight joints. The latter sealing rings extend between the floor of the filter basin and the bottoms of the gullet blocks to provide water-tight joints. Both types of blocks define water passageways in their interiors, and all of the abovementioned blocks have top walls formed with holes therein, whereby filtered water may flow from the filter media to the gullet, and backwash water may be conveyed from the gullet to and through the filter media in a reverse direction to clean the media.

BACKGROUND OF THE INVENTION

General description of water filters

Filters used for the conditioning or filtration of water may be of the enclosed or pressure type, or of the open gravity type. Pressure filters are usually used only for small flows or when filtration must be carried out under pressure conditions. Gravity filters are used for the larger installations, where the flows to be filtered are of considerable magnitude.

Filters of the gravity or open type are usually constructed of concrete. Where more than one is required, they are generally placed side by side in batteries. A modern gravity filter can be described as a concrete basin provided with a bottom underdrain or strainer system. Above the underdrain system there is usually placed a bed of gravel of carefully graded sizes, and a depth from 6″ to 18″.

This bed of coarse gravel supports the filter sand which is of finer size and which accomplishes the filtration of the liquid. The filter sand is carefully graded and is composed usually of silica sand, anthracite coal, or a combination of both. Where silica sand is employed, the bed depth is approximately 24″. If anthracite coal alone is used, the depth is from 30″ to 36″. When a combination of both is used, it is customary to use a bed depth of 6″ to 12″ of relatively fine sand directly above the gravel. Above the sand is placed a coarser bed of anthracite coal of depths of 12″ to 24″.

Coagulated or settled water is applied to upper portion of the filter tank and filters down through the sand and gravel, thence through the underdrain system to the filter outlet.

When the filter becomes clogged, it is washed by forcing filtered water upward through the underdrain system, gravel and sand. The sand is lifted and thoroughly agitated in the rising stream of clean water. All the finely divided and suspended material gathered at the surface is carried away in the wash water for either wasting or partial recovery. After washing, the filter is again ready for service. The washing period ordinarily lasts from four to ten minutes, depending upon the amount of material to be removed from the filter sand or media. Filters may operate continuously for periods from 12 hours to several days between washes, depending on the characteristics of the applied water.

Types of underdrain systems

The important function played by the underdrain system has occasioned the development of a number of types which have been widely used. These are briefly described as follows:

Perforated pipe system.—The perforated pipe system consists of a large diameter header or supply pipe or duct bisecting the filter. At intervals of from 6″ to 9″ there are installed small diameter lateral pipes at right angles to the header pipe. The lateral pipes extend from the header to the filter sides. They are closed at the outer end but are drilled on the underside with small diameter orifices on about 6″ centers. The combined area of the orifices is usually from about 0.3% to 0.5% of the area of the filter bottom. The perforated pipe underdrain system is reasonable to install. In view of the fact that the individual orifices are located about 6″ apart, they are not as efficient as desired on either filtration or backwash. Some channeling is experienced and the filter media is not uniformly used. Very few of the modern filtration plants are using this type of underdrain.

Tile block system.—Glazed tile blocks, with upper surface perforations, are used in many plants. These blocks are 11″ wide, of varying lengths and are installed on a thin bed layer of grout. After installation on the bed grout, each individual block must be grouted at ends and sides to insure water tightness. Functionally the tile block works well. However, breakage in handling is high, often as much or more than 25%. The installation costs of such bottom is great because of the large amount of labor necessary for the field grouting.

False floor systems.—There are a number of false floor underdrain systems available. These usually consist of precast concrete plates or porous plates supported above the filter floor on piers on tiedown bolts. Where precast plates are used, orifices or system distributing nozzles are placed in the top. These systems must be designed to support the upper filter bed material and, also, to withstand the tremendous uplift pressure occasioned by the application of back wash flow. In addition to the tie-down requirements, the plates must be hand grouted in place for sealing. Experience has shown the first cost of this type of underdrain is expensive and the installation costs are very high. Severe criticisms have been advanced against this type of underdrain system because of the high costs.

SUMMARY

The present underdrain system provided in this invention has been developed to overcome the objections pointed out above for underdrain systems now in use, and further to provide a highly economical underdrain system capable of uniformly removing the filtered liquid and, also, providing a uniform distribution of the backwash flow.

Briefly described, the system consists of installing on the filter floor a bottom composed of concrete underdrain and gullet blocks, each having a top surface perforated by a multiplicity of small holes or orifices, and an internal flow section or water passageway, and joined together by a unique sealing ring arrangement. This new method of sealing the joints of the individual blocks together precludes the necessity of using grout for this purpose and permits substantial savings of the installation cost of filter underdrain as compared to current practices.

BRIEF DESCRIPTION OF THE DRAWINGS

For a beter understanding of the invention, reference should be made to the accompanying drawings, forming part of this specification, in which:

FIG. 3 is a top plan view of a portion of the filtration plant.

FIG. 4 is a sectional view taken along the line 4—4 of FIG. 3, disclosing a number of the underdrain blocks and one of the gullet blocks, all being assembled with watertight joints therebetween.

FIG. 7 is an isometric view of one of the gullet blocks and its sealing rings.

FIG. 8 is a sectional view taken along the line 8—8 of FIG. 1, and showing the manner in which a gullet block is anchored to the filter basin over the gullet.

FIG. 9 is an isometric view of a fragmentary portion of a continuous flush metal insert that is used as part of the means for anchoring the gullet blocks in place.

FIG. 10 is an isometric view of one of the underdrain block and its sealing ring.

FIG. 11 is a sectional view taken through a filter and disclosing a modification of the means for placing the gullet in communication with the passageways of the underdrain blocks.

Figure 1:
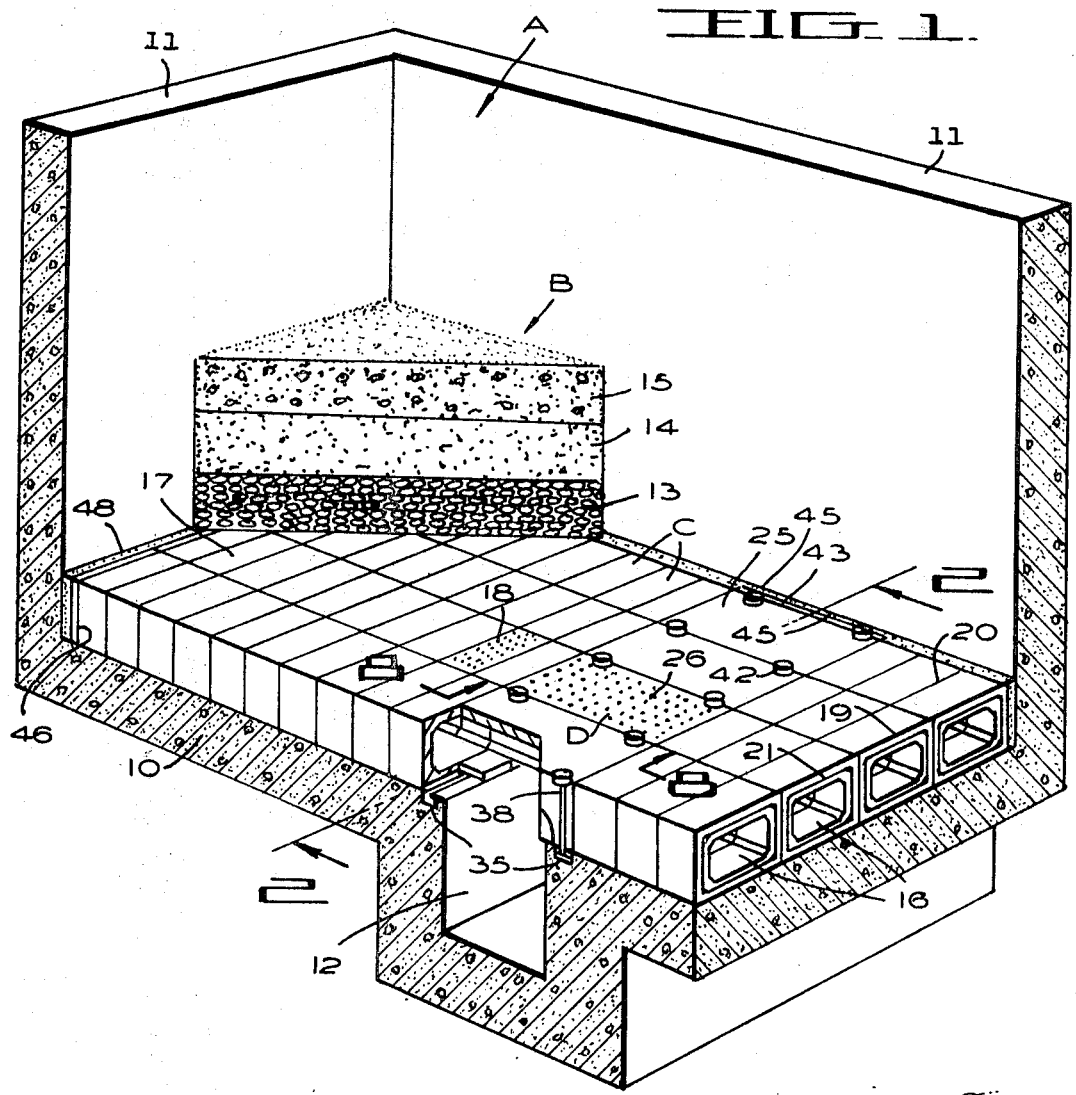
FIG. 1 is a fragmentary perspective view of my underdrain system for water filtration plant and showing the method of installing gullet and underdrain blocks.

While only the preferred embodiments of the invention have been shown, it should be understood that various changes, or modifications, may be made within the scope of the appended claims without departing from the spirit thereof.

DETAILED DESCRIPTION OF THE PREFERRED EMBODIMENTS

Referring now to the details of the first embodiment of the invention, as shown in FIGS. 1 to 10, inclusive, it will be noted that a filter basin designated generally at A has a floor 10 and upwardly-extending walls 11 rising therefrom to define a crib for holding filter media B, the filter basin being provided with a gullet 12 in the floor thereof. The filter media B has been disclosed as consisting of layers of gravel 13, sand 14 and anthracite coal 15.

Rows of underdrain blocks C rest on the floor 10 of the filter basin and are disposed under the filter media B, the underdrain blocks C in each row end-abutting one another and each being hollow to define a water passageway 16 extending lengthwise of each row. The rows of underdrain blocks extend laterally relative to the gullet 12, and each such block has a top wall 17 fashioned with a series of small holes 18 therein through which water may flow into and out of the water passageway 16.

Each underdrain block C defines opposite ends 19 and 20, the end 19 being formed with a groove 19a to receive a resilient sealing ring 21 surrounding the passageway 16, and the opposite end 20 of each underdrain block being flat. Thus each ring 21 on one underdrain block abutts the flat end 20 of the adjacent underdrain block in the same row. The underdrain blocks C in each row are moved endwise together in the manner hereinafter described to compress the rings 21 and thus provide watertight joints between adjacent underdrain blocks.

Moreover, a row of gullet blocks D rest on the floor 10 of the filter basin A under the filter media B, the gullet blocks being side-abutted with respect to one another, with the gullet blocks being centered and straddling the gullet 12. These gullet blocks are hollow to define a water passageway 22 extending lengthwise of the row. The water passageway 22 of each gullet block D communicates with the water passageway 16 of a row of the underdrain blocks C.

It will be seen from FIGS. 7 and 8 that each gullet block D has spaced transverse bottom strips 23 defining an opening 24 therebetween communicating with the gullet 12. This arrangement is further shown in FIG. 4. Each gullet block further has a top wall 25 formed with a series of small holes 26 therein through which water may flow into and out of the water passageways 22 of the gullet blocks.

Figure 2:
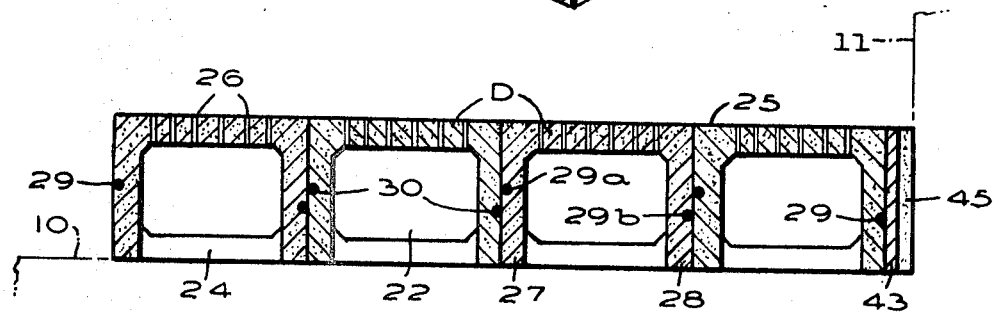
FIG. 2 is a sectional view taken along the line 2—2 of FIG. 1, illustrating a number of the assembled gullet blocks.

Each gullet block D defines opposite side walls 27 and 28 (see FIGS. 2 and 7), and a resilient sealing ring 29 has side sections 29a and 29b disposed on the block sides 27 and 28, respectively (see FIGS. 2, 7 and 8). The gullet blocks D in the row are moved sidewise in the manner hereinafter described to compress the gullet rings 29 to thus provide water-tight joints between adjacent gullet blocks.

Also, each gullet block sealing ring 29 has transverse sections 29c that are spaced from one another and extend along the spaced transverse bottom strips 23 of the gullet block on opposite sides of the bottom opening 24. The latter ring sections are compressed against the floor 10 of the filter basin A in the manner described later to provide water-tight joints.

As disclosed in FIGS. 7 and 8, the side walls 27 and 28 of each gullet block D is fashioned with a groove 30 to receive the side sections 29a and 29b of the sealing ring 29, and the underneath surface of the spaced transverse bottom strips 23 are formed with grooves 31 to receive the transverse sections 29c of the sealing rings 29 (also, see FIG. 4).

It will be apparent from FIGS. 7 and 8, as well as from FIG. 2, that the side sections 29a and 29b of the gullet block sealing ring 29 are arch-shaped, the arch of the side section 29a being higher and wider than the arch of the side section 29b, whereby the higher and wider arch on one side of the sealing ring on one gullet block D will encompass and clear the smaller arch on an adjacent gullet block, and the spaced transverse sections 29c of the gullet block sealing ring 29 converge toward one another from the lower ends of the larger arch to the lower ends of the smaller arch.

With particularly reference to FIGS. 4, 7 and 8, it will be apparent that each gullet block D has opposite ends 32 formed with grooves 33 in surrounding relation with the water passageway 22 and resilient rings 34 are disposed in these grooves so as to abut adjacent ends of the underdrain blocks C placed thereagainst.

The means for anchoring the gullet blocks D in place will now be set forth and reference is made to FIGS. 1, 3, 8 and 9 for this purpose. It will be noted that the floor 10 of the filter basin A has continuous flush metal inserts 35 anchored therein, one insert being disposed on each side of the gullet 12 underneath the row of gullet blocks D. Each metal insert 35 has a pair of inturned flanges 36 defining a slot 37 therebetween that extends lengthwise of the row of gullet blocks and anchoring tabs 35a.

Moreover, a pair of T-head hold-down bolts 38 is placed between adjacent gullet blocks D with their heads 39 anchored under the inturned flanges 36 and their shanks 40 projecting upwardly through the slots 37 to positions above the gullet blocks, whereby the gullet blocks may be moved along the lengths of the inserts when compressing the gullet block sealing rings 29. Washers 41 are disposed on the upper ends of the hold-down bolts to bridge across top wall portions of adjacent gullet blocks, and nuts 42 are threaded on the upper ends of these bolts that may be tightened to hold the gullet blocks in position. The shanks 40 of the hold-down bolts are accommodated in vertical recesses 40a formed in the sides of these blocks.

Initially, the nuts should be finger tightened and this will hold the gullet blocks D in place while permitting them to be moved toward one another. Then end plates 43, such as asbestos, are placed against the outermost gullet blocks in the row so as to abut the adjacent sections of the sealing rings 29 and protect the latter. Thereafter, end pressure is applied against the plates 43, as suggested by arrows 44 in FIG. 3, so as to move all of the gullet blocks tightly together, whereby the side sections 29a and 29b of the sealing rings 29 will be compressed to provide water-tight joints between adjacent gullet blocks. This end pressure may be done by means of a jack, as suggested by the legend "JACK" in FIG. 3.

Then the nuts 42 should be tightened to anchor the gullet blocks firmly to the floor 10 of the filter basin A and prevent them from separating. As the nuts 42 are tightened, the gullet blocks D will be urged against the floor 10 so that the transverse sections 29c of the sealing rings 29 will be compressed to provide water-tight joints between the strips 23 and the floor 10. Thereafter, the remaining spaces between the end plates 43 and the adjacent upwardly-extending walls 11 of the filter basin A filled with grout 45 and the latter permitted to harden.

It will be seen from FIGS. 3 to 6, inclusive, that closure plates 46 are disposed over the outermost underdrain block C in each row to cover the water passageway 16 thereof, while leaving spaces between these plates and the adjacent upwardly-extending walls 11 of the filter basin A. Then end pressure is applied to these underdrain blocks C to move all of them in the same row tightly together to compress the end sealing rings 21 and provide water-tight joints between adjacent such blocks in each row, and the application of the end pressure is suggested by the arrows 47 in FIG. 3, these arrows being shown as being disclosed with the word "JACK." Subsequently, the remaining spaces are filled with grout 48.

The sealing rings 21, 29 and 34 are made tacky so that they will adhere to the surfaces of the blocks against which they are initially placed, and these sealing rings will be held in position when the blocks are adjusted into their final positions. These sealing rings can be made of rubber, foam rubber, plastic or composition material. They may be flat or round as in O rings. They must be such that when the flat surface of the adjoining block is placed against the rings under pressure, a tight seal which prevents leakage is accomplished.

On completion of the concrete filter basin A, the slab should be sprayed with an inert liquid sealer covering the slab, but not the gullet 12. Also, the underdrain blocks C and the gullet blocks D should be sprayed or dipped with a like sealer liquid, thereby sealing the side walls of the holes 18 and 26 and thereby reducing any possible tendency of erosion of these water holes.

The individual underdrain blocks C may have a width of 16", a laying length of 8" and a depth of 12", with the top surfaces or walls 17 having a total of thirty holes 18 of 3/16" diameter, uniformly spaced and extending to the flow passageway 16 below. The gullet bocks D may be made with similar dimensions, excepting that their lengths will vary, depending on the width of the gullet 12 that they must span. While blocks of the above dimensions are presently proposed to permit their manufacture by standard or conventional block-making machines, the invention is not limited to these dimensions. Other sizes of blocks may be used, as determined by manufacturing methods, since this same method of sealing and installing can be employed.

Figure 5:
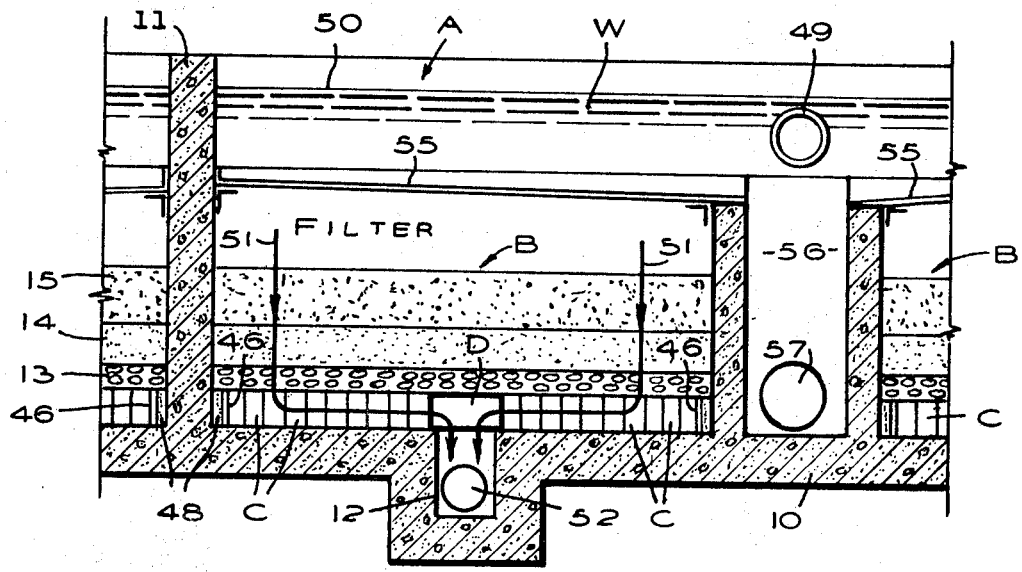
FIG. 5 is a sectional view taken along the line 5—5 of FIG. 3, with the filter media filtering the influent water.

When the filtration plant is being used for filtering water, such as in FIG. 5, the water is delivered to the filter basin A by an influent inlet 49, and the water W will rise in the basin to the level 50. This water will pass downwardly through the filter media B and will be conveyed through the water passageways 16 and 22 of the underdrain blocks C and gullet blocks D, respectively, to the gullet 12, as suggested by the arrows 51. The filtered water then passes into the effluent outlet 52.

Figure 6:
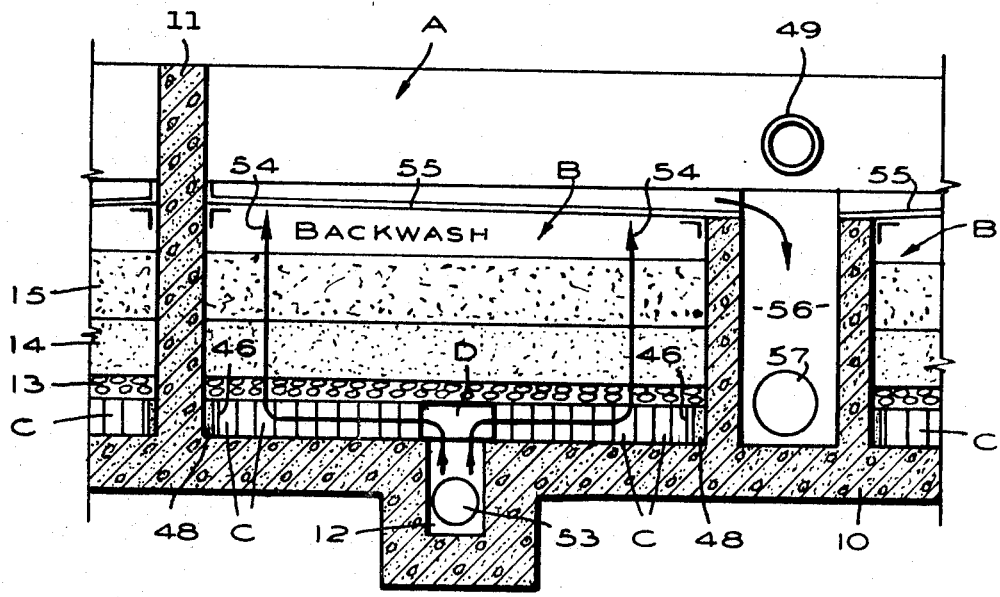
FIG. 6 is a view similar to FIG. 5, but with the filter media being backwashed.

During theh backwashing of the filter media B, as shown in FIG. 6, the necessary water is supplied by the backwash inlet 53 and this water takes the path suggested by the arrows 54, and is then conveyed by wash water troughs 55 to a waste water flume 56, and from this flume the waste water is discharged through an outlet 57.

It will be apparent from FIGS. 1, 5 and 6 that the depressed gullet 12 bisects the filter basin A, and this gullet is bridged by the precast concrete gullet blocks D.

In the modification shown in FIG. 11, the gullet 12a is beyond a concrete wall 58, such as below the waste water flume 56, and the underdrain blocks C are arranged at one side of this wall. The gullet blocks are omitted in this embodiment, and the wall 58 that is interposed between inner underdrain blocks C in each row and the gullet 12a is formed with openings 59 aligned with the water passageways 16 of these blocks. This interposed wall is provided on the filter side with recesses 60 to receive the end sealing rings 21 of the inner underdrain blocks C.

When the gullet 12a is arranged below the waste water flume 56, as in FIG. 11, a concrete slab 61 is interposed therebetween. The general operation of the filtration plant shown in FIG. 11 is the same as in FIGS. 1–10. Also, the installation of the underdrain blocks C proceeds in the modification in the same manner as in FIGS. 1–10. Accordingly, no further description of the modification is deemed necessary.

Inasmuch as the underdrain blocks C and the gullet blocks D are made from concrete, they may be made near the job site when sand and gravel are available, rather than shipping them from a distant plant, and this will save materially on costs by eliminating transportation costs.

I claim:
1. In an underdrain system for water filtration plant:
(a) a filter basin having a floor and upwardly-extending walls rising therefrom to define a crib for holding filter media, the filter basin being provided with a gullet in the floor thereof;
(b) rows of underdrain blocks resting on the floor of the filter basin and disposed under the filter media, the underdrain blocks in each row end-abutting one another and each being hollow to define a water passageway extending lengthwise of each row;
(c) the rows of underdrain blocks extending laterally relative to the gullet, and each such block having a top wall fashioned with a series of holes therein through which water may flow into and out of the water passageway;
(d) each underdrain block defining opposite ends, and a resilient sealing ring surrounding the water passageway at one end of each underdrain block, with this ring abutting the end of the adjacent underdrain block in the same row, each row of underdrain blocks having an outermost underdrain block that is spaced from an adjacent upwardly-extending wall of the filter basin, a closure plate disposed in this space and butted against this outermost underdrain block to form a closure over the hollow portion of that block, the closure plate being disposed so that jack pressure may be applied thereto in a direction to move the underdrain blocks in each row endwise together to compress the rings and thus provide water-tight joints between adjacent underdrain blocks without requiring the use of grout therebetween, and the remaining space between the closure plate and the adjacent upwardly-extending wall of the filter basin being filled with grout, with the closure plate being disposed to prevent this grout from entering the hollow portion of the outermost underdrain block;
(e) and means placing the water passageways of the underdrain blocks in communication with the gullet, whereby filtered water effluent may flow through the holes and water passageways from the filter media to the gullet, or backwash water may flow in the reverse direction from the gullet and through the filter media to clean the latter.

2. The underdrain system for water filtration plant, as set forth in claim 1:
 (f) and in which the sealing ring of each underdrain block is accommodated in a groove formed in one end of such block, and the adjacent end of the next underdrain block in the same row is flat and against which the ring is compressed.

3. The underdrain system for water filtration plant, as set forth in claim 2:
 (g) and in which the sealing rings are tacky so as to adhere to the grooved ends of the underdrain blocks.

4. The underdrain system for water filtration plant, as set forth in claim 1:
 (f) and in which the means placing the water passageways of the underdrain blocks in communication with the gullet is provided by a row of gullet blocks resting on the floor of the filter basin under the filter media, the gullet blocks being side-abutted with respect to one another, with the row of gullet blocks centered and straddling the gullet, the gullet blocks being hollow to define a water passageway extending lengthwise of the row of gullet blocks, the water passageway of each gullet block communicating with the water passageway of a row of the underdrain blocks;
 (g) each gullet block having spaced transverse bottom strips defining a bottom opening therebetween communicating with the gullet;
 (h) each gullet block further having a top wall formed with a series of holes therein through which water may flow into and out of the water passageways of the gullet blocks;
 (i) resilient end sealing rings compressed between the ends of the gullet blocks and adjacent ends of the underdrain blocks to provide water tight joints therebetween without requiring the use of grout;
 (j) each gullet block defining opposite side walls, and a resilient sealing ring having side sections disposed on the opposite side walls of each gullet block, the gullet blocks in the row being moved sidewise together to compress the gullet block rings to thus provide water-tight joints between adjacent gullet blocks without requiring the use of grout;
 (k) each gullet block sealing ring further having spaced transverse sections extending along the spaced transverse bottom strips of a gullet block on opposite sides of the opening in the bottom of the gullet block, and the latter ring sections being compressed against the floor of the filter basin to provide water-tight joints without requiring the use of grout.

5. The underdrain system for water filtration plant, as set forth in claim 4:
 (l) and in which the side walls of each gullet block is fashioned with a groove to receive the side sections of the gullet block sealing ring, and the underneath surface of the spaced transverse bottom strips are fashioned with grooves to receive the transverse sections of the same sealing ring.

6. The underdrain system for water filtration plant, as set forth in claim 5:
 (m) and in which the gullet block sealing rings are tacky so as to adhere to the grooves in the gullet blocks.

7. The underdrain system for water filtration plant, as set forth in claim 4:
 (l) and in which the row of gullet blocks has outermost gullet blocks at opposite ends of the row that are spaced from the adjacent upwardly-extending walls of the filter basin;
 (m) end plates arranged in these spaces and butted against the outermost gullet blocks in the row, these end plates being disposed so that jack pressure may be applied thereto in directions to move the gullet blocks sidewise together to compress the side sections of the gullet block sealing rings and thus provide water-tight joints between adjacent gullet blocks without requiring the use of grout therebetween;
 (n) and the remaining spaces between the end plates and the adjacent upwardly-extending walls of the filter basin being filled with grout.

8. The underdrain system for water filtration plant, as set forth in claim 4:
 (l) and in which the side sections of the gullet block sealing rings are arch-shaped, the arch on one side of each gullet block being higher and wider than the arch on the other side of the same block, whereby the higher and wide arch of the sealing ring on one gullet block will encompass and clear the smaller arch on an adjacent gullet block, the spaced transverse sections of the gullet block sealing ring converging toward one another from the lower ends of the larger arch to the lower ends of the smaller arch.

9. The underdrain system for water filtration plant, as set forth in claim 4:
 (l) and in which the floor of the filter basin has continuous flush metal inserts anchored therein, one insert being disposed on each side of the gullet underneath the row of gullet blocks;
 (m) each metal insert having a pair of inturned flanges defining a slot therebetween that extend lengthwise of the row of gullet blocks;
 (n) series of T-head hold-down bolts having their heads anchored under the inturned flanges and their shanks projecting upwardly through the slots of the inserts to positions above the gullet blocks, whereby the gullet blocks may be moved along the lengths of the inserts when compressing the gullet block sealing rings;
 (o) washers disposed on the upper ends of the hold-down bolts to bridge across top wall portions of adjacent gullet blocks, and nut sthreaded on the upper ends of these bolts that may be tightened to hold the gullet blocks in adjusted positions.

10. The underdrain system for water filtration plant, as set forth in claim 9:
 (p) and in which the gullet blocks are provided with vertical recesses in the outer surfaces of their opposite side walls, these recesses in adjacent gullet blocks registering with one another and through which the bolt shanks extend above the gullet blocks.

11. The underdrain system for water filtration plant, as set forth in claim 1:
 (f) and in which the means placing the water passageways of the underdrain blocks in communication with the gullet is provided by a wall interposed between inner underdrain blocks in each row and the gullet, this interposed wall being formed with openings aligned with the water passageways of these blocks.

12. The underdrain system for water filtration plant, as set forth in claim 11:
 (g) and in which the interposed wall is provided on the filter side with recesses to receive the end sealing rings of adjacent underdrain blocks.

References Cited
UNITED STATES PATENTS 3,468,422  9/1969  Camp _____ 210—293 X
2,378,239  6/1945  Myron _____ 210—293

REUBEN FRIEDMAN, Primary Examiner
T. A. GRANGER, Assistant Examiner